(12) United States Patent
Hasegawa et al.

(10) Patent No.: US 7,450,660 B2
(45) Date of Patent: Nov. 11, 2008

(54) APPARATUS AND METHOD FOR DIGITAL MODULATION

(75) Inventors: Teruaki Hasegawa, Takatsuki (JP); Takaaki Konishi, Ibaraki (JP)

(73) Assignee: Panasonic Corporation, Osaka (JP)

( * ) Notice: Subject to any disclaimer, the term of this patent is extended or adjusted under 35 U.S.C. 154(b) by 596 days.

(21) Appl. No.: 11/115,112

(22) Filed: Apr. 27, 2005

(65) Prior Publication Data

US 2005/0238115 A1    Oct. 27, 2005

(30) Foreign Application Priority Data

Apr. 27, 2004    (JP) .............................. 2004-131896

(51) Int. Cl.
    *H04L 27/36* (2006.01)
(52) U.S. Cl. .................. 375/298; 375/308; 375/371; 375/261; 375/300; 375/225
(58) Field of Classification Search ................ 375/298, 375/308, 371, 261, 300, 225
    See application file for complete search history.

(56) References Cited

U.S. PATENT DOCUMENTS

| | | | |
|---|---|---|---|
| 6,144,712 A * | 11/2000 | Samueli et al. ............. | 375/371 |
| 6,381,265 B1 * | 4/2002 | Hessel et al. ............... | 375/219 |
| 6,504,879 B1 | 1/2003 | Iwamatsu | |
| 6,546,044 B1 | 4/2003 | Dent | |
| 2003/0174784 A1 * | 9/2003 | Samarasooriya et al. ... | 375/308 |
| 2004/0037366 A1 * | 2/2004 | Crawford .................... | 375/295 |

FOREIGN PATENT DOCUMENTS

JP    11-163953    6/1999

* cited by examiner

*Primary Examiner*—Shuwang Liu
*Assistant Examiner*—Kabir A Timory
(74) *Attorney, Agent, or Firm*—McDermott Will & Emery LLP

(57) ABSTRACT

A first interpolation section 14 and a second interpolation section 24 perform sampling on input data Id4 and Qd4 having a sampling frequency fover so that resulting data will have a sampling frequency fsamp, which is equal to an operating clock frequency of a digital-to-analog converter, which is an output destination. In the above manner, the data is interpolated. At this time, the first interpolation section 14 and the second interpolation section 24 perform interpolation using a frequency ratio between the sampling frequency fover and the sampling frequency fsamp. Then, output data Id5 and Qd5 having the sampling frequency fsamp is outputted to a quadrature modulation section 31.

12 Claims, 5 Drawing Sheets

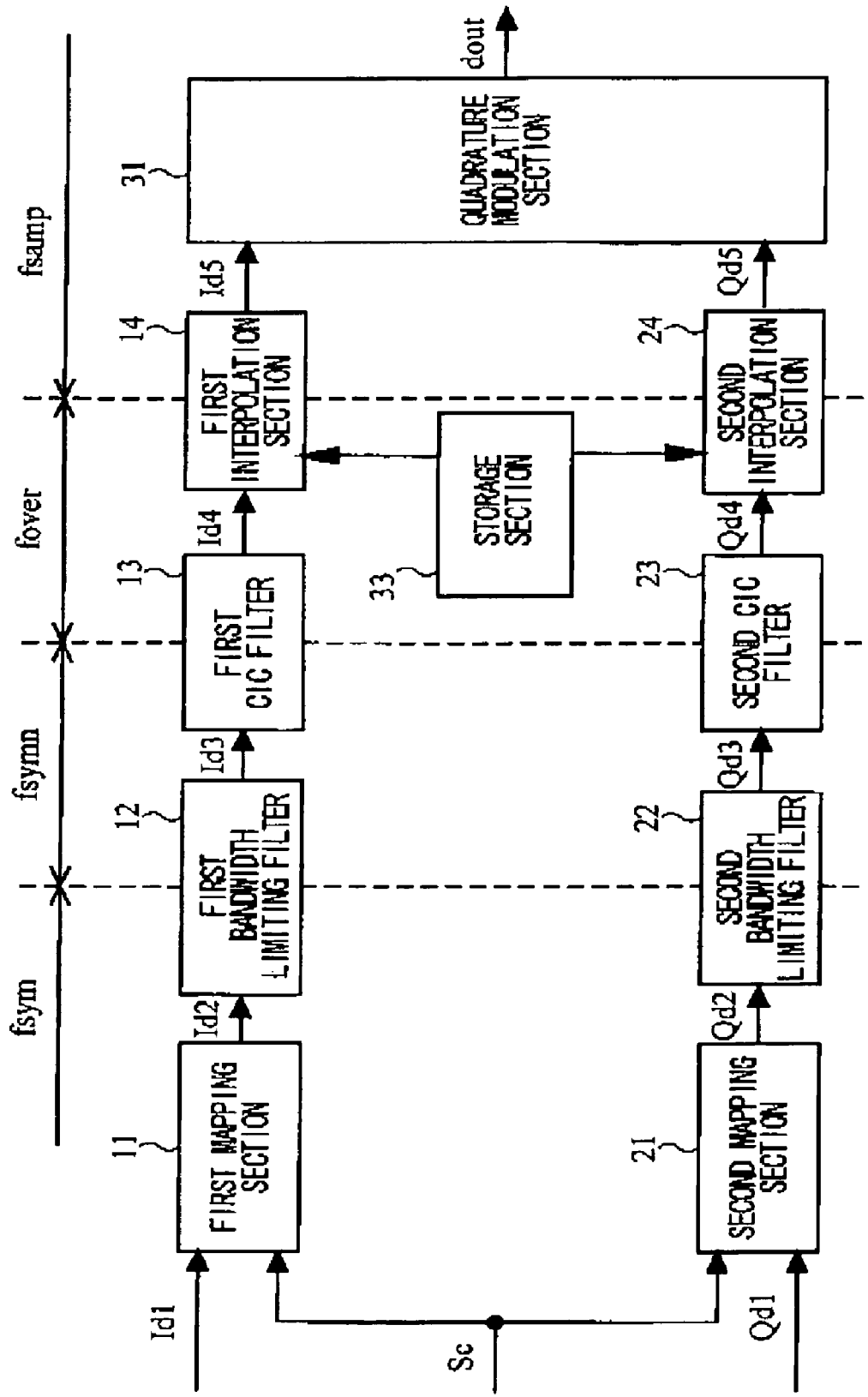
F I G. 5

APPARATUS AND METHOD FOR DIGITAL MODULATION

BACKGROUND OF THE INVENTION

1. Field of the Invention

The present invention relates to an apparatus and method for digital modulation and, more particularly, to an apparatus and method for digital modulation in which a plurality of different sampling frequencies are used for digital modulation.

2. Description of the Background Art

Conventionally, a digital modulator is used in a transmitter in a digital cable television set-top box, a transmitter in a digital satellite broadcasting, and the like. For example, as disclosed in FIG. 1 of Japanese Laid-Open Patent Publication No. 11-163953, a digital modulator performs interpolation using interpolators and filters. Hereinafter, with reference to FIG. 3, a digital quadrature modulator disclosed in Japanese Laid-Open Patent Publication No. 11-163953 is described. FIG. 3 is a block diagram illustrating an exemplary conventional digital quadrature modulator.

As illustrated in FIG. 3, the conventional digital quadrature modulator includes input terminals 101 and 105, an output terminal 111, interpolators 102 and 106, digital filters 103 and 107 with an operating frequency of fs2, digital multipliers 104 and 108, a digital adder 109, and a digital-to-analog converter 110. The input terminal 101 is connected to the interpolator 102. The interpolator 102 is connected to the filter 103. The filter 103 is connected to the multiplier 104. The multiplier 104 is connected to the adder 109. Similarly, the input terminal 105 is connected to the interpolator 106. The interpolator 106 is connected to the filter 107. The filter 107 is connected to the multiplier 108. The multiplier 108 is connected to the adder 109. The adder 109 is connected to the digital-to-analog converter 110. The digital-to-analog converter 110 is connected to the output terminal 111.

In the following description of an operation of the digital quadrature modulator, fsa and fsb (fsa=fsb/4) represent sampling frequencies, and fc (fc=fsb/4) represents a carrier frequency. In-phase component data with a sampling frequency of fsa is inputted to the interpolator 102 via the input terminal 101. This input data is frequency-converted by the interpolator 102 to have a sampling frequency of fsb and supplied to the filter 103. The filter 103 removes an unnecessary frequency component from the supplied data and outputs the resulting data to the multiplier 104. In a similar manner, quadrature component data with a sampling frequency of fsa is inputted to the interpolator 106 via the input terminal 105. This input data is frequency-converted by the interpolator 106 to have a sampling frequency of fsb and supplied to the filter 107. The filter 107 removes an unnecessary frequency component from the supplied data and outputs the resulting data to the multiplier 108. The multiplier 104 multiplies the in-phase component data, which has been frequency-converted to have the sampling frequency of fsb, by $\cos(2\cdot\pi\cdot fc\cdot T)$, where $T=n/fsb$ (n: integer). The multiplier 108 multiplies the quadrature component data by $\sin(2\cdot\pi\cdot fc\cdot T)$. The data multiplied by the multiplier 104 and the data multiplied by the multiplier 108 are supplied to the adder 109, where the two pieces of data are added to each other, and the resulting data is supplied to the digital-to-analog converter 110. The digital-to-analog converter 110 converts the supplied data to analog data, and outputs via the output terminal 111 the analog data, which has been subjected to quadrature modulation. Thus, in the conventional digital quadrature modulator, interpolated output is obtained by employing a single or multiple sampling frequencies having a fixed value.

Here, the frequency (sampling frequency) of an operating clock of the digital-to-analog converter when converting the data to analog data is fixed in accordance with the carrier system, for example, at 200 MHz. In addition, data inputted to the interpolators has a symbol rate in accordance with the standard of the interpolators. This symbol rate is, for example, 0.772 MHz or 1.544 MHz. The interpolators perform oversampling so that the data having such a symbol rate will have a frequency close to the frequency of the operating clock of the digital-to-analog converter 110 when converting the data to the analog data. However, the frequency resulting from this frequency conversion by the interpolators is an integral multiple of the input frequency. Therefore, the interpolators are incapable of performing oversampling such that the resulting frequency would be exactly equal to the frequency of the operating clock of the digital-to-analog converter 110 when converting the data to the analog data. Specifically, for the symbol rate of 0.772 MHz, the sampling rate will be 0.772*256=197.632 MHz. For the symbol rate of 1.544 MHz, the sampling rate will be 1.544*128=197.632 MHz. If data having such a sampling rate is converted by the digital-to-analog converter to analog data, the modulated output may contain spurious.

SUMMARY OF THE INVENTION

Therefore, an object of the present invention is to provide an apparatus and method for digital modulation which reduce spurious in modulated output when performing oversampling so that inputted data having a predetermined symbol rate will have a frequency of an operating clock of a digital-to-analog converter.

In order to achieve the above object, the present invention adopts a structure described below. Note that reference numerals and the like enclosed within parentheses only indicate correspondence to an embodiment described below to facilitate the understanding of the present invention and not limit the scope of the present invention in any manner.

A digital modulation apparatus according to the present invention subjects in-phase component data (Id2) and quadrature component data (Qd2) to quadrature modulation and produces output with a predetermined output frequency (fsamp). The digital modulation apparatus includes a first filter (12), a second filter (13), a first interpolation section (14), a third filter (22), a fourth filter (23), a second interpolation section (24), and a quadrature modulation section (31). The first filter limits the bandwidth of the in-phase component data using a first sampling frequency (fsymn), which is an integral multiple of (n times) a symbol frequency of the in-phase component data. The second filter performs oversampling on data (Id3) outputted from the first filter using a second sampling frequency (fover), which is an integral multiple of (m times) the first sampling frequency. The first interpolation section interpolates data (Id4) outputted from the second filter so that the resulting data will have the predetermined output frequency. The third filter limits the bandwidth of the quadrature component data using the first sampling frequency, which is an integral multiple of a symbol frequency of the quadrature component data. The fourth filter performs oversampling on data (Qd3) outputted from the third filter using the second sampling frequency, which is an integral multiple of the first sampling frequency. The second interpolation section interpolates data (Qd4) outputted from the fourth filter so that resulting data will have the predetermined output frequency. The quadrature modulation section subjects data (Id5) outputted from the first interpolation section and data (Qd5) outputted from the second interpolation section to digital quadrature modulation and outputs resulting data (dout).

The first interpolation section and the second interpolation section may each interpolate the data using a frequency ratio between the second sampling frequency and the predetermined output frequency (i.e., fover/fsamp). For example, each of the first sampling frequency and the second sampling frequency is at least a sampling frequency derived from the predetermined output frequency by performing digital frequency division in a regular or irregular manner. In this case, using a frequency ratio or frequency dividing ratio between the second sampling frequency and the predetermined output frequency, a number of samples (i.e., an elimination interval) between a sampling stop point in the second sampling frequency as compared to the predetermined output frequency and a next sampling stop point, and a position (j) relative to the sampling stop point, each of the first interpolation section and the second interpolation section converts the second sampling frequency to the predetermined output frequency, and produces interpolated output based on the predetermined output frequency. Further, using a value of a sample previous to the sampling stop point in the second sampling frequency as compared to the predetermined output frequency and a value of a sample following the sampling stop point, each of the first interpolation section and the second interpolation section may convert the second sampling frequency to the predetermined output frequency, and produce interpolated output based on the predetermined output frequency.

Also, as an example, the digital modulation apparatus according to the present invention may further comprise bypassing means for, if the second sampling frequency is equal to the predetermined output frequency, outputting the data outputted from the second filter and the data outputted from the fourth filter to the quadrature modulation section while an interpolation process in the first interpolation section and the second interpolation section, respectively, is bypassed. As another example, the digital modulation apparatus may further comprise bypassing means for, in the case where each of the first sampling frequency and the second sampling frequency is at least a sampling frequency derived from the predetermined output frequency by performing digital frequency division in a regular or irregular manner, and if a number of samples between a sampling stop point in the second sampling frequency as compared to the predetermined output frequency and a next sampling stop point is equal to or greater than a threshold value, allowing the data outputted from the second filter and the data outputted from the fourth filter to bypass an interpolation process by the first interpolation section and the second interpolation section, respectively, and outputting the data to the quadrature modulation section.

The digital modulation apparatus according to the present invention may further comprise a storage section for previously storing the frequency ratio between the second sampling frequency and the predetermined output frequency.

A digital modulation method according to the present invention subjects in-phase component data and quadrature component data to quadrature modulation and produces output with a predetermined output frequency. The digital modulation method includes a first filtering step, a second filtering step, a first interpolation step, a third filtering step, a fourth filtering step, a second interpolation step, and a quadrature modulation step. The first filtering step performs bandwidth limitation on the in-phase component data using a first sampling frequency, which is an integral multiple of a symbol frequency of the in-phase component data. The second filtering step performs oversampling on data subjected to the bandwidth limitation by the first filtering step, using a second sampling frequency, which is an integral multiple of the first sampling frequency. The first interpolation step interpolates data subjected to oversampling by the second filtering step so that resulting data will have the predetermined output frequency. The third filtering step performs bandwidth limitation on the quadrature component data using the first sampling frequency, which is an integral multiple of a symbol frequency of the quadrature component data. The fourth filtering step performs oversampling on data subjected to the bandwidth limitation by the third filtering step, using the second sampling frequency, which is an integral multiple of the first sampling frequency. The second interpolation step interpolates data subjected to oversampling by the fourth filtering step so that resulting data will have the predetermined output frequency. The quadrature modulation step subjects data outputted from the first interpolation step and data outputted from the second interpolation step to digital quadrature modulation, and outputs resulting data.

The first interpolation step and the second interpolation step each may interpolate the data using a frequency ratio between the second sampling frequency and the predetermined output frequency. Each of the first sampling frequency and the second sampling frequency is at least a sampling frequency derived from the predetermined output frequency by performing digital frequency division in a regular or irregular manner. In this case, using a frequency ratio or frequency dividing ratio between the second sampling frequency and the predetermined output frequency, a number of samples between a sampling stop point in the second sampling frequency as compared to the predetermined output frequency and a next sampling stop point, and a position relative to the sampling stop point, each of the first interpolation step and the second interpolation step converts the second sampling frequency to the predetermined output frequency, and produces interpolated output based on the predetermined output frequency. Further, using a value of a sample previous to the sampling stop point in the second sampling frequency as compared to the predetermined output frequency and a value of a sample following the sampling stop point, each of the first interpolation step and the second interpolation step may convert the second sampling frequency to the predetermined output frequency, and produce interpolated output based on the predetermined output frequency.

As an example, the digital modulation method according to the present invention may further comprise a bypassing step for, if the second sampling frequency is equal to the predetermined output frequency, supplying the data processed by the second filtering step and the data processed by the fourth filtering step to a process by the quadrature modulation step while an interpolation process by the first interpolation step and the second interpolation step, respectively, is bypassed. Also, as another example, the digital modulation method according to the present invention may further comprise a bypassing step for, in the case where each of the first sampling frequency and the second sampling frequency is at least a sampling frequency derived from the predetermined output frequency by performing digital frequency division in a regular or irregular manner, and if a number of samples between a sampling stop point in the second sampling frequency as compared to the predetermined output frequency and a next sampling stop point is equal to or greater than a threshold value, supplying the data processed by the second filtering step and the data processed by the fourth filtering step to a process by the quadrature modulation step while an interpolation process by the first interpolation step and the second interpolation step, respectively, is bypassed.

Also, the digital modulation method according to the present invention may further comprise a storage step for previously storing the frequency ratio between the second sampling frequency and the predetermined output frequency.

When performing oversampling on in-phase component data and quadrature component data having a predetermined symbol frequency so that the resulting data will have a predetermined output frequency, the digital modulation apparatus according to the present invention, which is provided with the first and second interpolation sections, is capable of reducing spurious in modulated output. For example, the frequency of the operating clock of a digital-to-analog converter for converting data to analog data is fixed in accordance with the carrier system. When performing oversampling on data so that the resulting data will have a frequency close to the frequency of the operating clock of the digital-to-analog converter, setting the frequency of the operating clock of the digital-to-analog converter at the predetermined output frequency when the digital modulation apparatus produces output to the digital-to-analog converter allows the spurious occurring in the modulated output to be reduced. That is, the digital modulation apparatus according to the present invention involving a use of a plurality of different sampling frequencies is capable of reducing spurious which occurs in modulation because of difference of sampling frequencies.

Also, in the case where the frequency ratio between the second sampling frequency and the predetermined output frequency is used when interpolating data, precise data interpolation can be performed. Even if the first sampling frequency and the second sampling frequency are sampling frequencies derived from the predetermined output frequency by performing digital frequency division in a regular or irregular manner, precise data interpolation can be performed based on the above frequency ratio, an elimination interval, a position relative to a portion on which an elimination process has been performed, and previous and following sample data.

Also, in the case where the digital modulation apparatus includes the bypassing means, interpolation can be performed appropriately by comparing to what extent the interpolation would reduce spurious with interpolation processing load on the first interpolation section and the second interpolation section.

Also, in the case where the digital modulation apparatus includes the storage means, the processing load on the first interpolation section and the second interpolation section is reduced.

Also, in accordance with the digital modulation method according to the present invention, the same effects as achieved by the above-described digital modulation apparatus can be achieved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram illustrating the structure of a digital modulator provided with a storage section according to an embodiment of the present invention.

DESCRIPTION OF THE PREFERRED EMBODIMENTS

Figure 1:
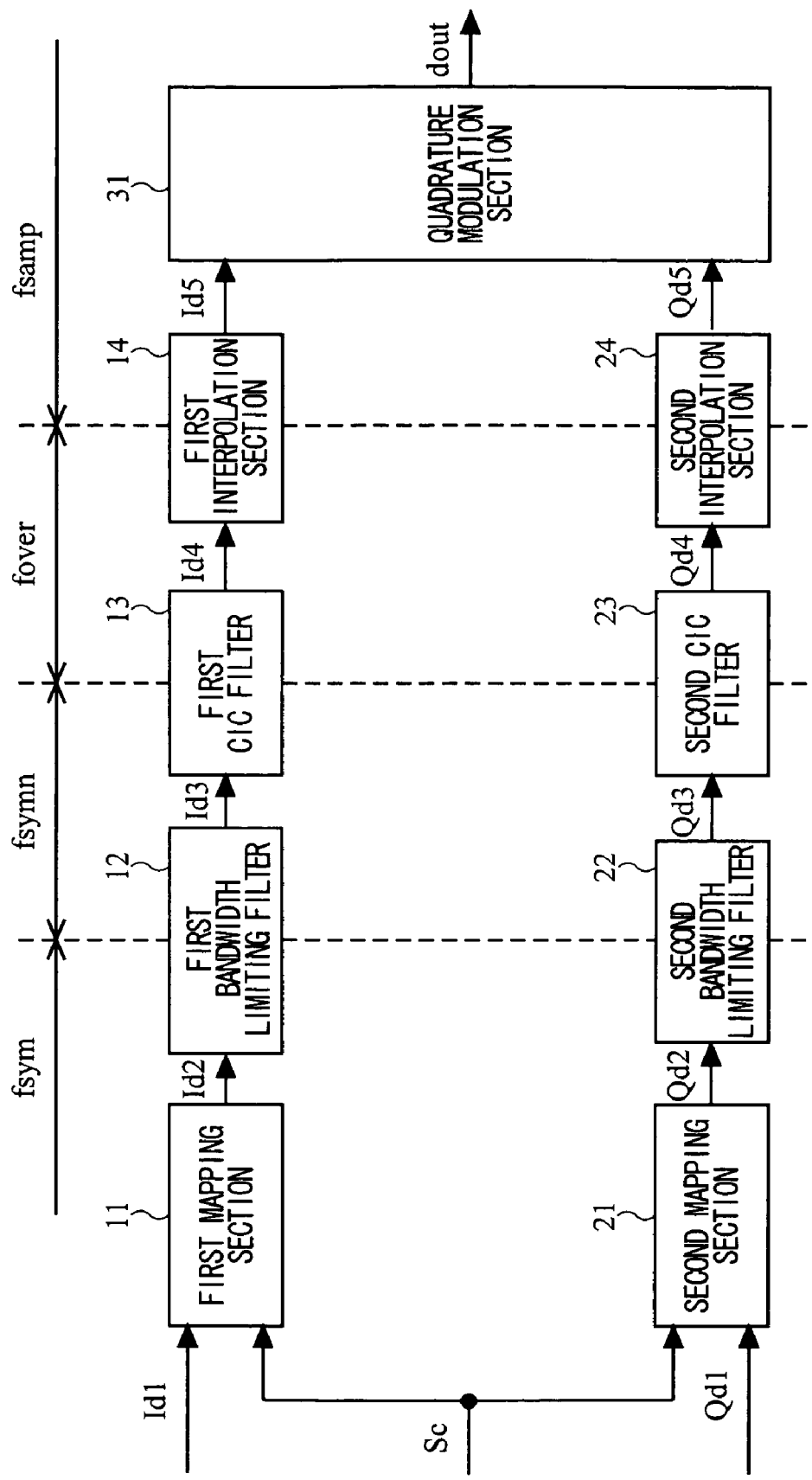
FIG. 1 is a block diagram illustrating the structure of a digital modulator according to an embodiment of the present invention.

With reference to FIG. 1, a digital modulator according to an embodiment of the present invention is described. FIG. 1 is a block diagram illustrating the structure of the digital modulator.

In FIG. 1, the digital modulator includes a first mapping section 11, a first bandwidth limiting filter 12, a first CIC (Cascaded Integrator-Comb) filter 13, a first interpolation section 14, a second mapping section 21, a second bandwidth limiting filter 22, a second CIC filter 23, a second interpolation section 24, and a quadrature modulation section 31.

The first mapping section 11 encodes in-phase component data Id1 with a symbol frequency of fsym, which synchronizes with symbols, and outputs encoded in-phase component data Id2 to the first bandwidth limiting filter 12. Note that the in-phase component data Id2 may be outputted to the first bandwidth limiting filter 12 via a pre-equalizer, which provides an inverse characteristic to a distortion in a transmission path, in order to offset the distortion in the transmission path.

The first bandwidth limiting filter 12 is typically a lowpass filter (a root roll-off filter), and performs bandwidth limitation with controlled intersymbol interference between digital signals with a root roll-off characteristic. In addition, the first bandwidth-limiting filter 12 is caused to operate with an operating frequency n times as high as the symbol frequency fsym (where n is an integer), whereby n times interpolation is performed. Therefore, the first bandwidth limiting filter 12 outputs, to the first CIC filter 13, output data Id3 which is obtained by subjecting the in-phase component data Id2 with the symbol frequency fsym to frequency conversion so that the resulting data will have a frequency n times as high as the symbol frequency fsym.

The first CIC filter 13 performs oversampling of signals, and is caused to operate with an operating frequency m times as high as the frequency fsymn (where m is an integer), whereby m times interpolation is performed. Therefore, the first CIC filter 13 outputs, to the first interpolation section 14, output data Id4 which is obtained by subjecting the output data Id3 with the sampling frequency fsymn to frequency conversion so that the resulting data will have a sampling frequency fover, which is m times as high as the sampling frequency fsymn. Therefore, the sampling frequency fover is n×m times as high as the symbol frequency fsym.

The first interpolation section 14 performs sampling on the output data Id4 with the sampling frequency fover so that the resulting data will have a sampling frequency fsamp, which is equal to an operating clock frequency of a digital-to-analog converter (not shown), which is an output destination. In the above manner, interpolation is performed. Then, output data Id5 with the sampling frequency fsamp is outputted to the quadrature modulation section 31. A method of interpolation performed in the first interpolation section 14 is described in detail further below.

On the other hand, the second mapping section 21 encodes quadrature component data Qd1 with a symbol frequency of fsym, which synchronizes with symbols, and outputs encoded quadrature component data Qd2 to the second bandwidth limiting filter 22. Note that the quadrature component data Qd2 may be outputted to the second bandwidth limiting filter 22 via a pre-equalizer, which provides an inverse characteristic to a distortion in a transmission path, in order to offset the distortion in the transmission path.

The second bandwidth limiting filter 22 is typically a low-pass filter (a root roll-off filter), and performs bandwidth limitation with controlled intersymbol interference between digital signals with a root roll-off characteristic. In addition, the second bandwidth-limiting filter 22 is caused to operate with an operating frequency n times as high as the symbol frequency fsym (where n is an integer), whereby n times interpolation is performed. Therefore, the second bandwidth limiting filter 22 outputs, to the second CIC filter 23, output data Qd3 which is obtained by subjecting the quadrature component data Qd2 with the symbol frequency fsym to frequency conversion so that the resulting data will have a frequency n times as high as the symbol frequency fsym.

The second CIC filter 23 performs oversampling of signals, and is caused to operate with an operating frequency m times as high as the frequency fsymn (where m is an integer), whereby m times interpolation is performed. Therefore, the second CIC filter 23 outputs, to the second interpolation section 24, output data Qd4 which is obtained by subjecting the output data Qd3 with the sampling frequency fsymn to frequency conversion so that the resulting data will have a sampling frequency fover, which is m times as high as the sampling frequency fsymn. Therefore, the sampling frequency fover is n×m times as high as the symbol frequency fsym.

The second interpolation section 24 performs sampling on the output data Qd4 with the sampling frequency fover so that the resulting data will have a sampling frequency fsamp, which is equal to the operating clock frequency of the digital-to-analog converter (not shown), which is the output destination. In the above manner, interpolation is performed. Then, output data Qd5 with the sampling frequency fsamp is outputted to the quadrature modulation section 31. A method of interpolation performed in the second interpolation section 24 is described in detail further below.

The quadrature modulation section 31 subjects the output data Id5 of the in-phase component and the output data Qd5 of the quadrature component to quadrature modulation, and outputs resulting output data dout to the digital-to-analog converter (not shown), which operates with the operating clock of the sampling frequency fsamp. Specifically, the quadrature modulation section 31 includes two complex multipliers, a numerical control oscillator (NCO), and an adder. One of the two complex multipliers multiplies the output data Id5 of the in-phase component by a digital trigonometric function cos generated by the NCO. The other complex multiplier multiplies the output data Qd5 of the quadrature component by a digital trigonometric function sin generated by the NCO. The adder adds the data outputted from the former complex multiplier and the data outputted from the latter complex multiplier together, and the resulting data is outputted from the quadrature modulation section 31 as output data dout.

The output data dout outputted from the quadrature modulation section 31 is outputted to the digital-to-analog converter via an ISF (Inverse of the SINC response Filter), for example. The ISF provides, to the output data dout outputted from the quadrature modulation section 31, an inverse characteristic to a SINC function, and outputs to the digital-to-analog converter.

Figure 2:
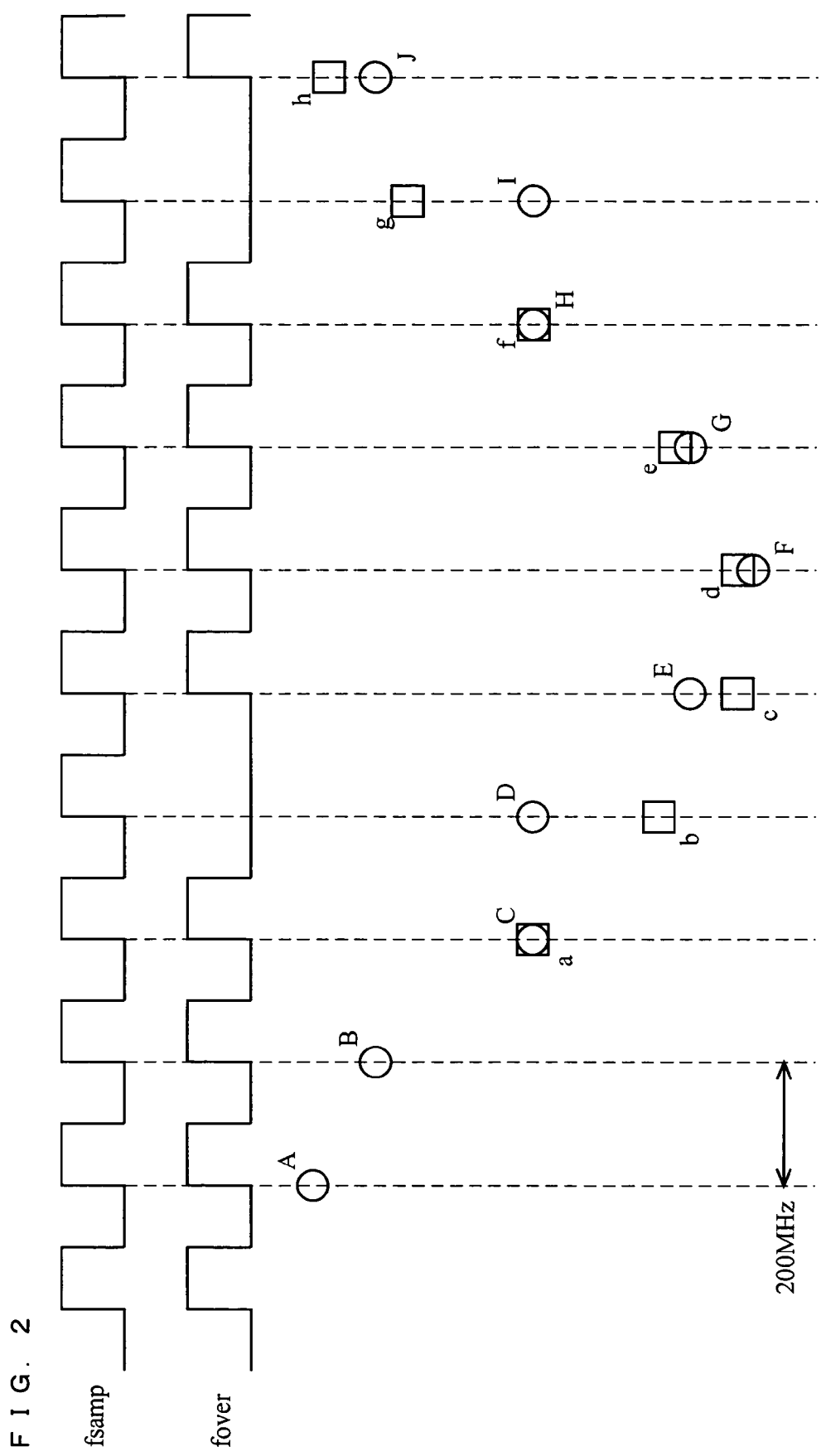
FIG. 2 illustrates an interpolation algorithm performed in the first interpolation section 14 and the second interpolation section 24 of FIG. 1.
Figure 3:
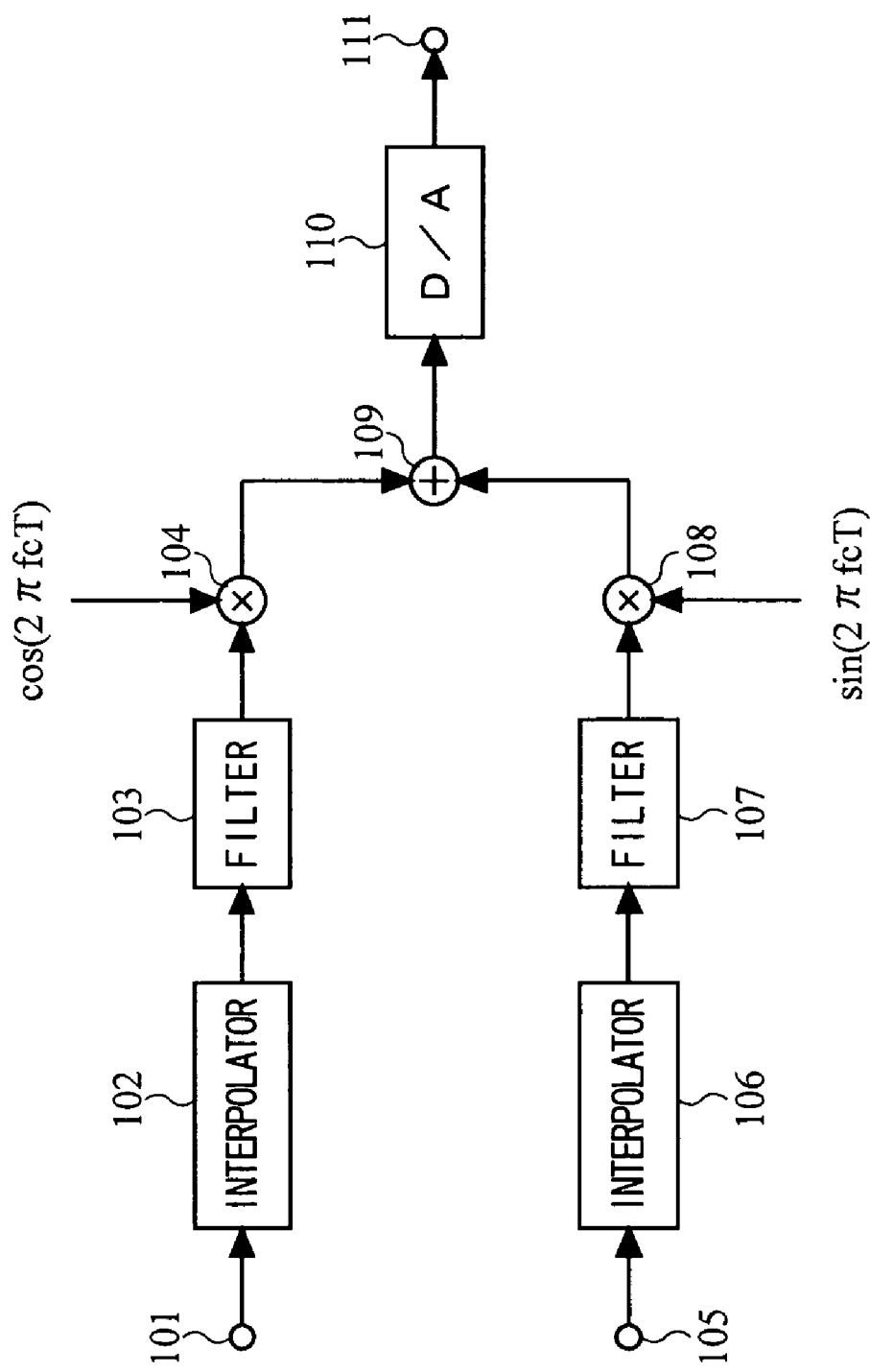
FIG. 3 is a block diagram illustrating an exemplary conventional digital quadrature modulator.
Figure 4:
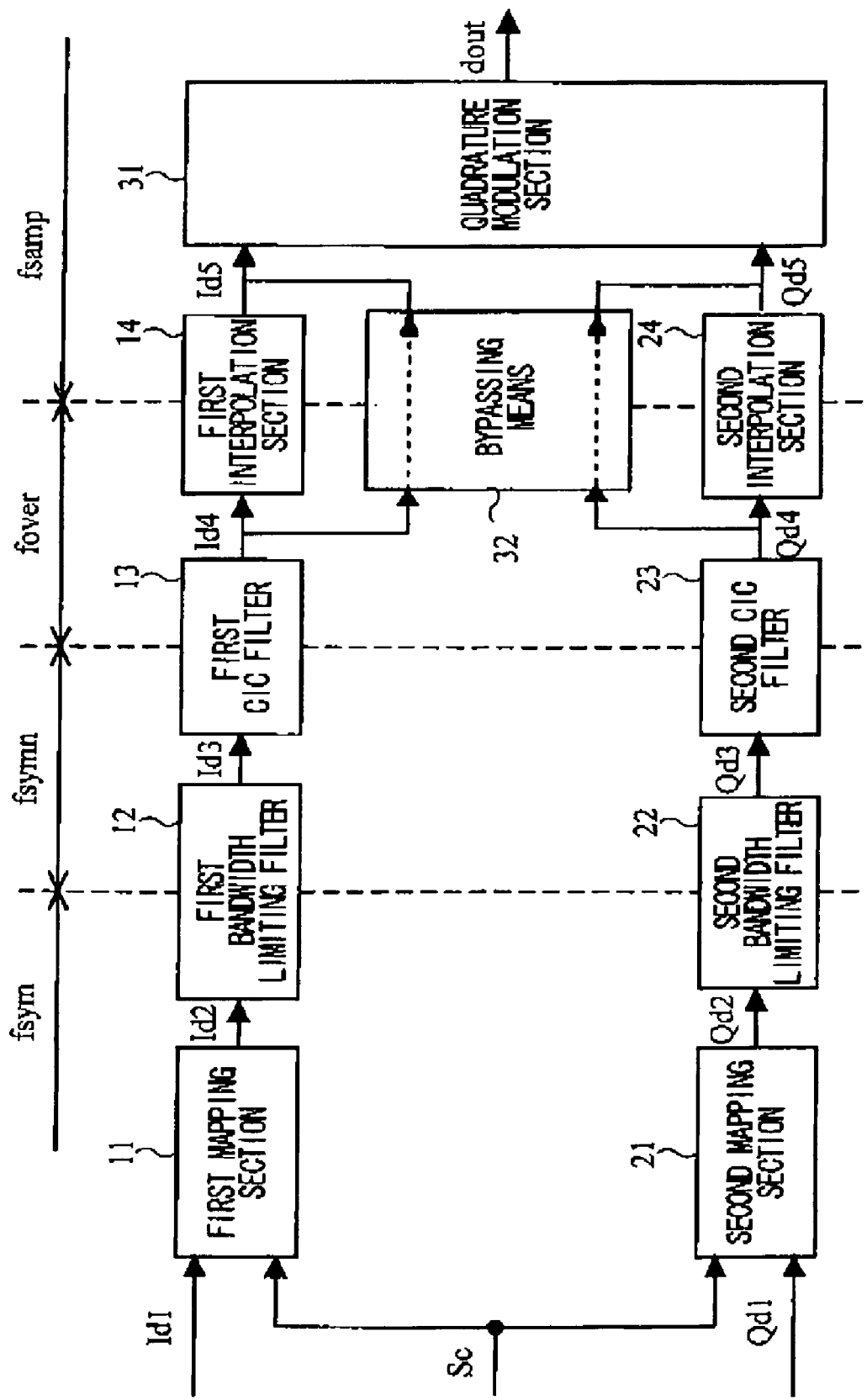
FIG. 4 is a block diagram illustrating the structure of a digital modulator provided with bypassing means according to an embodiment of the present invention.

With reference to FIG. 2, the method of interpolation performed in the first interpolation section 14 and the second interpolation section 24 is described. FIG. 2 is an illustration of an interpolation algorithm performed in the first interpolation section 14 and the second interpolation section 24.

FIG. 2 illustrates an exemplary signal which synchronizes with the sampling frequency fsamp and an exemplary signal which synchronizes with the sampling frequency fover. For example, the sampling frequency fsamp is 200 MHz, and the sampling frequency fover is 160 MHz. The signal which synchronizes with the sampling frequency fover is generated by performing digital frequency division (an elimination process) on the signal which synchronizes with the sampling frequency fsamp. Because the ratio of the sampling frequency fover to the sampling frequency fsamp is 160:200=4:5, an elimination interval for the signal which synchronized with the sampling frequency fover is set to five.

First, using the sampling frequency fsamp, the first interpolation section 14 and the second interpolation section 24 perform further sampling on the output data Id4 and the output data Qd4, respectively, each having the sampling frequency fover. Pieces of data resultant from the further sampling using the sampling frequency fsamp are represented by data A to J (circles in FIG. 2) corresponding to respective reference time points. Then, using equation (1) below, the first interpolation section 14 and the second interpolation section 24 perform interpolation on the data resultant from the further sampling using the sampling frequency fsamp. The pieces of interpolated data are represented by data a to h (squares in FIG. 2) corresponding to the respective reference time points.

(Equation 1)

$$\text{out}(s) = \text{in}(s) + \{\text{in}(s+1) - \text{in}(s)\} \times \left\{ \frac{fover}{fsamp} - j\left(1 - \frac{fover}{fsamp}\right) \right\} \tag{1}$$

where out(s) is output from the first interpolation section 14 or the second interpolation section 24 at time point s, in (s) is output from the first CIC filter 13 or the second CIC filter 23 at time point s, and j is, in connection with the signal which synchronizes with the sampling frequency fover, a value which increments by one at each reference time point (at each sampling instance), with a starting value (0) being set at a point on which the elimination process has been performed.

For example, in the case of data a in FIG. 2, which is immediately previous to a portion on which the elimination process has been performed, j=4. Therefore:

$$a = C + (D-C)*0/5 = C.$$

Thus, data a has a value equal to that of data C, which is output from the first CIC filter 13 or the second CIC filter 23. In the case of data b in FIG. 2, which corresponds to the portion on which the elimination process has been performed, j=0. Therefore:

$$b = D + (E-D)*4/5.$$

In the case of data c in FIG. 2, which is next to the portion on which the elimination process has been performed, j=1. Therefore:

$$c = E + (F-E)*3/5.$$

In the case of data d in FIG. 2, which is second data from the portion on which the elimination process has been performed, j=2. Therefore:

$$d = F + (G-F)*2/5.$$

In the case of data e in FIG. 2, which is third data from the portion on which the elimination process has been performed, j=3. Therefore:

$$e=G+(H-G)*1/5.$$

In the case of data f in FIG. 2, which is fourth data from the portion on which the elimination process has been performed (i.e., data immediately previous to a next portion on which the elimination process has been performed), j=4. Therefore:

$$f=H+(I-H)*0/5=H.$$

Thus, data f has a value equal to that of data H, which is output from the first CIC filter 13 or the second CIC filter 23.

As described above, spurious which noticeably occurs, owing to difference of sampling frequencies, at portions on which the elimination process has been performed can be reduced by interpolation based on a frequency ratio. In other words, in the digital modulator according to the embodiment of the present invention, when performing oversampling on data inputted to the modulator with a predetermined symbol rate so that the data will have a frequency close to the frequency of the operating clock of the digital-to-analog converter, the performing of the interpolation process based on the frequency ratio can reduce the spurious occurring in the modulated output.

In general, the symbol frequency for the in-phase component data Id1 and the quadrature component data Qd1 inputted to the digital modulator and the frequency of the operating clock of the digital-to-analog converter are both fixed, or the two frequencies are selected from a plurality of frequency combinations. Therefore, it is possible to previously infer the frequency ratio between the sampling frequency fover and the sampling frequency fsamp. Therefore, a result of calculation of the frequency ratio between the sampling frequency fover and the sampling frequency fsamp may be previously stored in a ROM included in the digital modulator. Thus, processing load on the first interpolation section 14 and the second interpolation section 24 is reduced. FIG. 5 is a block diagram illustrating a structure in which the digital modulator shown in FIG. 1 is further provided with a storage section. In FIG. 5, the storage section 33, which is a ROM, stores in advance the frequency ratio between the sampling frequency fover and sampling frequency fsamp.

In cases where the interpolation process by the first interpolation section 14 and the second interpolation section 24 would not produce much effect, the first interpolation section 14 and the second interpolation section 24 may be bypassed. For example, the cases where the interpolation process would not produce much effect include a case where the signal which synchronizes with the sampling frequency fover is generated by performing digital frequency division (the elimination process) on the signal which synchronizes with the sampling frequency fsamp, and the elimination interval for the signal which synchronized with the sampling frequency fover is greater than a predetermined threshold value (e.g., the frequency ratio between the sampling frequency fover and the sampling frequency fsamp≈1), and the like.

Specifically, if the symbol frequency fsym is 0.128 MHz, the sampling frequency fover is 199.680 MHz (0.1288*390*4=199.680 MHz). Further, if the sampling frequency fsamp is 200 MHz, the frequency ratio between the sampling frequency fover and the sampling frequency fsamp is 199.680:200.000=624:625; therefore, the elimination interval is set to 625. In this case, spurious which occurs, owing to difference of sampling frequencies, at portions on which the elimination process has been performed is small in magnitude. Therefore, an appropriate threshold value referred to when determining whether the first interpolation section 14 and the second interpolation section 24 should be bypassed may be set, comparing the extent to which interpolation would reduce spurious with the interpolation processing load on the first interpolation section 14 and the second interpolation section 24. Previously detecting the elimination interval and elimination portions for the sampling frequency fsamp when generating the sampling frequency fover will eliminate the need to detect them when performing the interpolation process in the first interpolation section 14 and the second interpolation section 24. In the above manner, the detection of the elimination interval and the elimination portions for the sampling frequency fsamp can be performed easily. Such bypassing of the first interpolation section 14 and the second interpolation section 24 based on the sampling frequency fover and the sampling frequency fsamp can be achieved by using a well known mechanism or the like. However, such a mechanism is not a necessary component, but may be applied depending on the device requirements.

While the invention has been described in detail, the foregoing description is in all aspects illustrative and not restrictive. It is understood that numerous other modifications and variations can be devised without departing from the scope of the invention.

What is claimed is:

1. A digital modulation apparatus for subjecting in-phase component data and quadrature component data to quadrature modulation and producing output with a predetermined output frequency, the apparatus comprising:

a first filter for performing bandwidth limitation on the in-phase component data using a first sampling frequency, which is an integral multiple of a symbol frequency of the in-phase component data;

a second filter for performing oversampling on data outputted from the first filter using a second sampling frequency, which is an integral multiple of the first sampling frequency;

a first interpolation section for interpolating data outputted from the second filter so that resulting data will have the predetermined output frequency;

a third filter for performing bandwidth limitation on the quadrature component data using the first sampling frequency, which is an integral multiple of a symbol frequency of the quadrature component data;

a fourth filter for performing oversampling on data outputted from the third filter using the second sampling frequency, which is an integral multiple of the first sampling frequency;

a second interpolation section for interpolating data outputted from the fourth filter so that resulting data will have the predetermined output frequency; and a quadrature modulation section for subjecting data outputted from the first interpolation section and data outputted from the second interpolation section to digital quadrature modulation, and outputting resulting data, wherein each of the first sampling frequency and the second sampling frequency is at least a sampling frequency derived from the predetermined output frequency by performing digital frequency division in a regular or irregular manner, and using a frequency ratio or frequency dividing ratio between the second sampling frequency and the predetermined output frequency, a number of samples between a sampling stop point in the second sampling frequency as compared to the predetermined output frequency and a next sampling stop point, and a position relative to the sampling stop point, each of the first interpolation section and the second interpolation section converts the second sampling frequency to the predetermined output frequency, and produces interpolated output based on the predetermined output frequency.

2. The digital modulation apparatus according to claim 1, wherein each of the first interpolation section and the second interpolation section interpolates the data using a frequency ratio between the second sampling frequency and the predetermined output frequency.

3. The digital modulation apparatus according to claim 1, wherein, using a value of a sample previous to the sampling stop point in the second sampling frequency as compared to the predetermined output frequency and a value of a sample following the sampling stop point, each of the first interpolation section and the second interpolation section converts the second sampling frequency to the predetermined output frequency, and produces interpolated output based on the predetermined output frequency.

4. The digital modulation apparatus according to claim 1, further comprising bypassing means for, if the second sampling frequency is equal to the predetermined output frequency, outputting the data outputted from the second filter and the data outputted from the fourth filter to the quadrature modulation section while an interpolation process in the first interpolation section and the second interpolation section, respectively, is bypassed.

5. A digital modulation apparatus for subjecting in-phase component data and quadrature component data to quadrature modulation and producing output with a predetermined output frequency, the apparatus comprising:
 a first filter for performing bandwidth limitation on the in-phase component data using a first sampling frequency, which is an integral multiple of a symbol frequency of the in-phase component data;
 a second filter for performing oversampling on data outputted from the first filter using a second sampling frequency, which is an integral multiple of the first sampling frequency;
 a first interpolation section for interpolating data outputted from the second filter so that resulting data will have the predetermined output frequency;
 a third filter for performing bandwidth limitation on the quadrature component data using the first sampling frequency, which is an integral multiple of a symbol frequency of the quadrature component data;
 a fourth filter for performing oversampling on data outputted from the third filter using the second sampling frequency, which is an integral multiple of the first sampling frequency;
 a second interpolation section for interpolating data outputted from the fourth filter so that resulting data will have the predetermined output frequency; and
 a quadrature modulation section for subjecting data outputted from the first interpolation section and data outputted from the second interpolation section to digital quadrature modulation, and outputting resulting data,
 wherein each of the first sampling frequency and the second sampling frequency is at least a sampling frequency derived from the predetermined output frequency by performing digital frequency division in a regular or irregular manner, and
 the digital modulation apparatus further comprises bypassing means for, if a number of samples between a sampling stop point in the second sampling frequency as compared to the predetermined output frequency and a next sampling stop point is equal to or greater than a threshold value, allowing the data outputted from the second filter and he data outputted from the fourth filter to bypass an interpolation process by the first interpolation section and the second interpolation section, respectively, and outputting the data to the quadrature modulation section.

6. The digital modulation apparatus according to claim 2, further comprising a storage section for previously storing the frequency ratio between the second sampling frequency and the predetermined output frequency.

7. A digital modulation method for subjecting in-phase component data and quadrature component data to quadrature modulation and producing output with a predetermined output frequency, the method comprising:
 a first filtering step for performing bandwidth limitation on the in-phase component data using a first sampling frequency, which is an integral multiple of a symbol frequency of the in-phase component data;
 a second filtering step for performing oversampling on data subjected to the bandwidth limitation by the first filtering step, using a second sampling frequency, which is an integral multiple of the first sampling frequency;
 a first interpolation step for interpolating data subjected to oversampling by the second filtering step so that resulting data will have the predetermined output frequency;
 a third filtering step for performing bandwidth limitation on the quadrature component data using the first sampling frequency, which is an integral multiple of a symbol frequency of the quadrature component data;
 a fourth filtering step for performing oversampling on data subjected to the bandwidth limitation by the third filtering step, using the second sampling frequency, which is an integral multiple of the first sampling frequency;
 a second interpolation step for interpolating data subjected to oversampling by the fourth filtering step so that resulting data will have the predetermined output frequency; and
 a quadrature modulation step for subjecting data outputted from the first interpolation step and data outputted from the second interpolation step to digital quadrature modulation, and outputting resulting data,
 wherein each of the first sampling frequency and the second sampling frequency is at least a sampling frequency derived from the predetermined output frequency by performing digital frequency division in a regular or irregular manner, and
 using a frequency ratio or frequency dividing ratio between the second sampling frequency and the predetermined output frequency, a number of samples between a sampling stop point in the second sampling frequency as compared to the predetermined output frequency and a next sampling stop point, and a position relative to the sampling stop point, each of the first interpolation step and the second interpolation step converts the second sampling frequency to the predetermined output frequency, and produces interpolated output based on the predetermined output frequency.

8. The digital modulation meted according to claim 7, wherein each of the first interpolation step and the second interpolation step interpolates the data using a frequency ratio between the second sampling frequency and the predetermined output frequency.

9. The digital modulation method according to claim 7, wherein, using a value of a sample previous to the sampling stop point in the second sampling frequency as compared to the predetermined output frequency and a value of a sample following the sampling stop point, each of the first interpolation step and the second interpolation step converts the second sampling frequency to the predetermined output frequency, and produces interpolated output based on the predetermined output frequency.

10. The digital modulation method according to claim 7, further comprising a bypassing step for, if the second sampling frequency is equal to the predetermined output frequency, supplying the data processed by the second filtering step and the data processed by the fourth filtering step to a process by the quadrature modulation step while an interpolation process by the first interpolation step and the second interpolation step, respectively, is bypassed.

11. A digital modulation method for subjecting in-phase component data and quadrature component data to quadrature modulation and producing output with a predetermined output frequency, the method comprising;
   a first filtering step for performing bandwidth limitation on the in-phase component data using a first sampling frequency, which is an integral multiple of a symbol frequency of the in-phase component data;
   a second filtering step for performing oversampling on data subjected to the bandwidth limitation by the first filtering step, using a second sampling frequency, which is an integral multiple of the first sampling frequency;
   a first interpolation step for interpolating data subjected to oversampling by the second filtering step so that resulting data will have the redetermined output frequency;
   a third filtering step for performing bandwidth limitation on the quadrature component data using the first sampling frequency, which is an integral multiple of a symbol frequency of the quadrature component data;
   a fourth filtering step for performing oversampling, on data subjected to the bandwidth limitation by the third filtering step, using the second sampling frequency, which is an integral multiple of the first sampling frequency;
   a second interpolation step for interpolating data subjected to oversampling by the fourth filtering step so that resulting data will have the predetermined output frequency; and
   a quadrature modulation step for subjecting data outputted from the first interpolation step and data outputted from the second interpolation step to digital quadrature modulation, and outputting resulting data,
   wherein each of the first sampling frequency and the second sampling frequency is at least a sampling frequency derived from the predetermined output frequency by performing digital frequency division in a regular or irregular manner, and
   the digital modulation method further comprises a bypassing step for, if a number of samples between a sampling stop point in the second sampling frequency as compared to the predetermined output frequency and a next sampling stop point is equal to or greater than a threshold value, supplying the data processed by the second filtering step and the data processed by the fourth filtering step to a process by the quadrature modulation step while an interpolation process by the first interpolation step and the second interpolation step, respectively, is bypassed.

12. The digital modulation method according to claim 8, further comprising a storage step for previously storing the frequency ratio between the second sampling frequency and the predetermined output frequency.

* * * * *